US007005474B2

(12) United States Patent
Liu et al.

(10) Patent No.: US 7,005,474 B2
(45) Date of Patent: Feb. 28, 2006

(54) EPOXY POLYESTER, ITS EMULSION AND ITS PREPARATION AS WELL AS WATER-BASE COATINGS CONTAINING THE EMUSION

(75) Inventors: Fuchang Liu, Qingdao (CN); Wenlin Liu, Qingdao (CN); Peimin Hou, Qingdao (CN); Yuanhao Xu, Qingdao (CN)

(73) Assignee: Marine Research Institute of Chemical Industry, Qingdao (CN)

( * ) Notice: Subject to any disclaimer, the term of this patent is extended or adjusted under 35 U.S.C. 154(b) by 247 days.

(21) Appl. No.: 10/471,312

(22) PCT Filed: Mar. 11, 2002

(86) PCT No.: PCT/CN02/00144

§ 371 (c)(1),
(2), (4) Date: Jan. 1, 2004

(87) PCT Pub. No.: WO02/072658

PCT Pub. Date: Sep. 19, 2002

(65) Prior Publication Data

US 2004/0116599 A1 Jun. 17, 2004

(30) Foreign Application Priority Data

Mar. 10, 2001 (CN) .................................. 01107873 A

(51) Int. Cl.
*C08L 2/16* (2006.01)
*C08G 63/54* (2006.01)
*C08F 20/00* (2006.01)

(52) U.S. Cl. ................. 524/800; 528/295.3; 528/295.5; 528/302; 528/306; 525/438; 525/445.5; 525/445; 524/604; 524/714; 524/717; 524/724; 524/801; 524/804; 523/502; 523/503

(58) Field of Classification Search ............. 528/295.3, 528/295.5, 302, 306; 525/438, 444.5, 445; 524/604, 714, 717, 724, 800, 801, 804; 523/502, 523/503
See application file for complete search history.

(56) References Cited

U.S. PATENT DOCUMENTS 4,414,357 A * 11/1983 Wright et al. ................ 524/513
5,322,865 A * 6/1994 Inoue et al. ................. 523/501
6,333,378 B1 * 12/2001 Clark et al. ................. 524/560

FOREIGN PATENT DOCUMENTS

| DE | 3416365 | 12/1984 |
|----|---------|---------|
| JP | 3039317 | 2/1991 |
| JP | 3192166 | 8/1991 |
| JP | 5306377 | 11/1993 |
| JP | 11343456 | 12/1999 |

OTHER PUBLICATIONS

English Abstract of Japan 11343456 Dated Dec. 14, 1999.
English Abstract of Japan 3039317 Dated Feb. 20, 1991.
English Abstract of Japan 3192166 Dated Aug. 22, 1991.
English Abstract of Germany 3416365 Dated Dec. 13, 1984.

* cited by examiner

*Primary Examiner*—Samuel A. Acquah
(74) *Attorney, Agent, or Firm*—Ladas & Parry LLP

(57) ABSTRACT

The invention discloses an acrylic acid-modified epoxy polyester resin and the preparation process thereof. The resin comprises 100 pbw of a copolymer (A) formed from an unsaturated fatty acid-modified polyester and a bisphenol A type epoxy resin, and 20–40 pbw of poly(meth)acrylic acid (ester) (B). The preparation process comprises the following steps: (1) alcoholyzing a drying oil with a polyol; (2) adding successively, to the product from step (1), a dibasic anhydride, a fatty acid containing a conjugated double bond and an epoxy resin, and esterifying to obtain an epoxy polyester; and (3) copolymerizing the epoxy polyester from step (2) and an acrylic monomer. This invention also provides a water-based emulsion containing said resin, and a water-based paint exhibiting excellent antirust property and having low production cost.

15 Claims, No Drawings

EPOXY POLYESTER, ITS EMULSION AND ITS PREPARATION AS WELL AS WATER-BASE COATINGS CONTAINING THE EMUSION

FIELD OF THE INVENTION

This invention relates to a new polymer, an emulsion containing the same and preparations thereof, more particularly to an acrylic acid-modified epoxy polyester resin, an emulsion containing the same and preparations thereof. In addition, this invention relates to a water-based paint comprising said emulsion as a base material, particularly suitable for the anticorrosive coating on a metal surface.

BACKGROUND OF THE INVENTION

Along with the development of people's consciousness of environment protection, water-based paint is becoming more and more popular. This is mainly because the water-base paint does not contain an organic solvent and so is beneficial to the atmosphere and indoor environment. Nevertheless, the base material adopted by the existing water-based paint is mainly conventional emulsion and water-soluble resin. The former contains a large amount of emulsifiers and the water-proof property of the coating is poor. The latter comprises the acrylic or alkyd resin having a high acid value of 60–90 as a base and the self-drying property of the coating is poor.

In order to solve the above-mentioned technical problems, many efforts have been made. For example, an anticorrosive primer made from a water-based polyurethane-modified alkyd resin is disclosed in a AT patent No. 8,302,121, which is prepared by reacting a carboxyl-containing and polyether segment-containing acrylic acid-modified alkyd resin (A) and a polyurethane-modified alkyd resin (B) with a diisocyanate in an organic solvent to obtain an acrylic acid-polyurethane-modified alkyd resin, removing the solvent by vacuum distillation, adding an organic amine to neutralize the carboxyl group, emulsifying with water to obtain an acrylic-polyurethane modified alkyd emulsion, which is then mixed with the pigment, filler and aids to obtain an anticorrosive primer, which can be used for anticorrosive coating steel members. Nevertheless, owing to the presence of the hydrophilic polyether segment in the molecular chain of the resin, the water-proofness of the coating is poor and thus the anticorrosive property of the coating is adversely affected.

A water-based acrylic acid anticorrosive paint (Showa High polymer Co.) is disclosed in a JP patent No. 03,192,166, which comprises as a base material an acrylic emulsion made by emulsion polymerizing the monomers including styrene, alkyl (meth)acrylate esters, and glycidyl acrylate esters. The anticorrosive paint is mainly used as a pre-coating primer and a protective primer in equipment maintenance. Owing to the corrosion accelerating effect of the ion $SO_4^{2-}$ produced by a persulfate initiator during emulsion polymerization, the problem of flash and back corrosion occurs. Meanwhile the coating film is more hydrophilic and the rust resistance poor.

A water-based epoxy polyester primer (Dai Nippon Ink Co.) is disclosed in a JP patent No. 05,306,377, which is prepared by reacting an epoxy resin with a drying oil fatty acid to produce a drying oil-modified epoxy ester resin, and then reacting the epoxy ester resin with a carboxy-containing ethylenic monomer and other ethylenic unsaturated monomers to produce a vinyl-modified epoxy resin, then removing the solvent by vacuum distillation, neutralizing the carboxy group by adding an amine, emulsifying with water to form an epoxy ester emulsion, and mixing the resultant emulsion with a pigment, a filler, and an aid to obtain the anticorrosive primer. Owing to a great quantity of organic solvents contained in the intermediate product acrylic acid-modified epoxy ester resin during the synthesis of the resin, a treatment for the removal of the solvent is necessary, which consumes a large amount of energy and thus makes the production efficiency decrease.

Therefore, an object of this invention is to provide a new acrylic acid-modified epoxy polyester resin, which can be prepared from a raw material available easily and has a low cost. The resin can be used to prepare a water-based epoxy polyester emulsion, thereby producing a cost-effective water-based paint with excellent rust resistance.

Another object of this invention is to provide a process for preparing said new acrylic acid-modified epoxy polyester resin. By adopting said process, said resin can be economically and easily obtained.

A further object of this invention is to provide an emulsion produced from said resin.

Still a further object of this invention is to provide a process for preparing said emulsion.

A further object of this invention is to provide a water-based paint comprising the emulsion according to this invention as the base material. Said water-based paint has excellent rust resistance and low production cost.

SUMMARY OF THE INVENTION

For solving the above-mentioned technical problems, the inventors found, after researching in a meticulous way, that the objects of this invention can be achieved through the following: alcoholyzing a drying oil and a polyol in the presence of a catalyst; adding successively a dibasic anhydride, a unsaturated fatty acid containing a conjugated double bond and an epoxy resin and esterifying to obtain an epoxy polyester; and free radical copolymerizing said epoxy polyester and acrylic acid monomer mixtures to obtain an acrylic acid-modified epoxy polyester. Owing to the easy availability of raw materials and low concentration of an organic solvent so that the solvent removing step is omitted, the production cost is reduced. In addition, the result copolymerization product does not contain a polyether segment, and the acid value of the resin is far lower than that of the common water-soluble resin. Furthermore, after neutralized with an amine, said copolymerization product self-emulsifies to form a core-shell epoxy polyester emulsion having small particle size and excellent hydrophobicity. When used as a water-based paint, the emulsion can give good water repellence to the coating.

Accordingly, this invention provides an acrylic acid-modified epoxy polyester resin, composed of 100 pbw of a copolymer (A) made from an unsaturated fatty acid-modified polyester and a bisphenol A type epoxy resin, and 20–40 pbw of poly(meth)acrylic acid (ester) (B), which can be prepared by a process comprising the following steps:

(1) alcoholyzing a drying oil with a polyol;

(2) adding successively, to the product from step (1), a dibasic anhydride, a fatty acid containing conjugated double bond and an epoxy resin, and esterifying to obtain an epoxy polyester; and (3) copolymerizing the epoxy polyester from step (2) and an acrylic monomer.

This invention still provides a process for preparing the acrylic acid-modified epoxy polyester resin.

This invention still provides an epoxy polyester emulsion, comprising 30–50 wt/o of said acrylic acid-modified epoxy polyester resin.

This invention still provides a process for preparing said epoxy polyester emulsion, comprising the following steps:

(1) alcoholyzing a drying oil with a polyol;

(2) adding successively, to the product from step (1), a dibasic anhydride, a fatty acid containing a conjugated double bond and an epoxy resin, and esterifying to obtain an epoxy polyester;

(3) copolymerizing the epoxy polyester from step (2) and a (meth)acrylic acid (ester) to obtain an acrylic acid-grafted epoxy polyester resin; and (4) neutralizing the product from step (3) with a neutralizer, stirring with water, and self-emulsifying.

In addition, this invention still provides a water-based paint composition, which comprises, based on 100% of the total weight of the composition, 20–60 wt % of said acrylic acid-modified epoxy polyester emulsion.

DETAILED DESCRIPTION OF THE PREFERRED EMBODIMENTS

The acrylic acid-modified epoxy polyester resin (R) according to this invention, the acid value of which is preferably 20–40, composed of 100 pbw of a copolymer (A) formed from an unsaturated fatty acid-modified polyester and a bisphenol A type epoxy resin, and 20–40 pbw of poly(meth)acrylic acid (ester) (3), can be prepared by a process comprising the following steps:

(1) alcoholyzing a drying oil with a polyol;

(2) adding to the product from step (1) a dibasic anhydride, a fatty acid containing a conjugated double bond and an epoxy resin, and esterifying to obtain an epoxy polyester; and (3) copolymerizing the epoxy polyester from step (2) and an acrylic monomer.

In the present invention, a drying oil means an unsaturated vegetable oil having an iodine value above 130. Preferred drying oils are selected from a group consisting of linseed oil, dehydrated castor oil and soy bean oil. The drying oil is used at an amount of 30–60 pbw, and preferably 40–50 pbw, based on 100 pbw of (A).

In the present invention, polyol means a low molecular alcohol containing 2–4 hydroxy groups. Preferred polyols are selected from a group consisting of glycerin, pentaerythritol and trimethylolpropane. The polyol is used at an amount of 7–18 pbw, and preferably 10–15 pbw, based on 100 pbw of (A).

The alcoholysis in step (1) of the above preparation process is preferably conducted at 230–250° C. under nitrogen atmosphere in the presence of a catalyst.

There are no particular limitations for the dibasic anhydride. Preferred dibasic anhydrides are selected from a group consisting of phthalic anhydride, tetrahydrophthalic anhydride and maleic anhydride. The dibasic anhydrides are used at an amount of 10–30 pbw, and preferably 15–25 pbw, based on 100 pbw of (A).

There are no particular limitations for the fatty acid containing a conjugated double bond. From the viewpoint of a low cost, eleostearic acid is suitably used. The fatty acid containing a conjugated double bond is used at an amount of 2–10 pbw, and preferably 4–9 pbw., based on 100 pbw of (A).

In the present invention, the epoxy resin means a bisphenol A type difunctional epoxy resin having a weight average molecular weight of 900–2,000. Among them, epoxy resin E-12, epoxy resin E-20, or the mixture thereof are preferred. The epoxy resin is used at amount of 20–30 pbw, based on 100 pbw of (A). The resin viscosity is too high when the amount used is over 30 pbw. The resin is poor in water resistance when the amount used is lower than 20 pbw.

The esterification in step (2) of the preparation process is carried out in the presence of a catalyst at 180–220° C., preferably 200–220° C. When the acid value reaches 5–10, preferably 6–8, the reaction is completed. The resin is undesirable in water resistance when the acid value is greater than 10. The resin viscosity is too high and gelling tends to occur during the reaction when the acid value is lower than 5. The reaction between the polyester and the epoxy resin is mainly a reaction between the terminal carboxyl group of the polyester and the terminal epoxy group of the epoxy resin to obtain a straight-chain alternating copolymer.

The acrylic monomer is preferably one or more of the following: acrylic acid, methacrylic acid, butyl acrylate, butyl methacrylate and methyl methacrylate. The acrylic monomer is preferably used at an amount of 20–40 pbw based on 100 pbw of (A).

Under the action of an initiator, the acrylic monomer 1,4- or 1,2-co-polymerizes at the conjugated double bond of, for example, eleostearate, to form a copolymerization product comprising acrylate as a side-chain and epoxy polyester as a backbone.

According to a preferred embodiment of this invention, a process for preparing the acrylic acid-modified epoxy polyester resin according to this invention comprises:

1. mixing a drying oil, a polyol and an appropriate amount of a catalyst, heating up to 230–250° C. to alcoholyze, and when the 95% ethanol tolerance becomes 1:9, the alcoholysis is completed;

2. adding successively, to the alcoholysate, a dibasic anhydride, an epoxy resin and an eleostearic acid, and ester at 180–220° C. while maintaining the temperature, and when the acid value reaches 5–10, preferably 6–8 and the viscosity becomes 4–6 s, the esterification is completed. The system is cooled down to below 130° C.;

3. dropping in acrylic monomers and an initiator BPO over 1–3 hrs at 100–130° C. to conduct a copolymerization, after dropping is complete, the system is allowed to continue to reaction for 3–6 hrs while maintaining the temperature.

The catalysts for both alcoholzing and esterification are metal oxides or hydroxides, preferably PbO and LiOH. The initiator is an organic peroxide, preferably benzoyl peroxide (BPO).

When the copolymerization product obtained according to this invention is self-emulsified after neutralized with a neutralizer, the epoxy polyester segment in the copolymer is inside the emulsion particle to form a core and the polyacrylate segment is on the surface layer of the emulsion particle, which has an electric charge after neutralized, to form a shell. Thus an epoxy polyester emulsion having a core-shell structure is formed. Because the hydrolysis-resistant polyacrylate segment in on the shell layer and most of the carboxyl groups are on the shell layer, the self-emulsifying and emulsion stabilizing effects are good. Compared with the conventional water-soluble resin, the total acid value of the resin is greatly reduced, and the water resistance of the acrylic acid-modified epoxy polyester resin is greatly increased.

A neutralizer and industrial soft water are preferably added into the epoxy polyester resin prepared according to above-mentioned process, and stirred for 0.5 h to obtain an epoxy polyester emulsion having a solid content of 30–50 wt %.

The neutralizer is preferably one or more selected from a group consisting of 2-amino-1-propanol, N-ethylmorpholine, N,N-dimethyl-ethanolamine and triethylamine.

The industrial soft water means deionized water or distilled water, and the content of the water-soluble substances is less than 100 ppm, and the conductivity is less than 20 $\mu$s/cm.

The epoxy polyester emulsion according to this invention comprises 30–50% of the acrylic acid modified-epoxy polyester resin.

According to a preferred embodiment of this invention, the epoxy polyester emulsion according to this invention is prepared in accordance with the following formula:

| Ingredients | pbw |
| --- | --- |
| Drying oil | 30–60 |
| Polyol | 7–18 |
| Dibasic anhydride | 10–30 |
| Epoxy resin | 20–30 |
| Eleostearic acid | 2–10 |
| Acrylic monomer | 20–40 |
| Neutralizer | 3–6 |
| Industrial soft water | 125–250 |
| Catalyst | 0.01–0.05 |
| Initiator | 0.1–2.0 |

The drying oil is an unsaturated vegetable oil having an iodine value above 130. Preferred drying oil is one or more selected from a group consisting of linseed oil, dehydrated castor oil and soy bean oil. The preferred amount of the drying oil is 40–50 pbw.

The polyol is a low molecular alcohol containing 2–4 hydroxy groups. Preferred polyol is one or more selected from a group consisting of glycerin, pentaerythritol and trimethylolpropane. The preferred amount of the polyol is 10–15 pbw.

There are no particular limitations for the dibasic anhydride. Preferred dibasic anhydride is one or more selected from a group consisting of phthalic anhydride, tetrahydrophtalic anhydride and maleic anhydride. The preferred amount of the dibasic anhydride is 15–25 pbw.

The epoxy resin is a bisphenol A type difunctional epoxy resin having a weight average molecular weight of 900–2,000. The amount used of the epoxy resin is 20–30 pbw. The resin viscosity is too high when the amount used is greater than 30 pbw. The resin is poor in water resistance when the amount used is lower than 20 pbw.

The acrylic monomer is preferably one or more selected from a group consisting of acrylic acid, methacrylic acid, butyl acrylate, butyl methacrylate and methyl methacrylate.

The neutralizer is preferably one or more selected from a group consisting of 2-amino-1-propanol, N-ethylmorpholine, N,N-dimethyl-ethanolamine and triethylamine.

The industrial soft water is deionized water or distilled water, and the content of the water-soluble substances is less than 100 ppm, and the conductivity is less than 20 $\mu$s/cm.

The catalyst is metal oxides or hydroxides, preferably PbO and LiOH. The initiator is an organic peroxide, preferably benzoyl peroxide (BPO).

The epoxy polyester emulsion according to this invention is used as the base material to produce a water-based paint, comprising:

| Ingredients | wt % |
| --- | --- |
| Epoxy polyester emulsion | 20–60 |
| Inert antirust pigment | 5–30 |
| Active antirust pigment | 1–10 |
| Filler | 5–30 |
| Drier | 1–5 |
| Thickener | 0.2–5 |
| Aids | 0.5–2.5 |
| Industrial soft water | 5–10 |

The water-based paint can be prepared by a conventional method in the art, for example, a preparation process comprising the following steps:

(1) in a vessel, metering the industrial soft water and aids, and mixing well with an adjustable high speed dispersion machine (the same below);

(2) adding more than half the amount of the epoxy polyester emulsion, and mixing well;

(3) adding an inert antirust pigment, an active antirust pigment and a filler, and mixing well;

(4) grinding with a ball mill or a sand mill until a fineness is less than 50 $\mu$m to obtain a colored sly;

(5) in a paint mixer, adding said colored slurry, the remaining epoxy polyester emulsion and a drier, and mixing well; and (6) adding a thickener, mixing well, and filtering to obtain the final product.

The epoxy polyester emulsion is prepared by the above-mentioned process, with a solid content of 30–50 wt %. The preferred amount of said emulsion in the paint is 40–50 wt %.

There are no particular limitations for the inert antirust pigment. Any inert antirust pigment can be used provided that it does not react with the ingredients in said water-based paint composition. The inert antirust pigment is preferably one or more selected from a group consisting of iron oxide red and mica-iron oxide. The preferred amount of the inert antirust pigment in the paint is 10–25 wt %.

There are no particular limitations for the active antirust pigment. Preferred are one or more selected from a group consisting of $Zn_3(PO_4)_2$, $ZnMoO_4$, zinc chrome yellow, strontium chrome yellow, aluminum triphosphate, basic lead chromate/silicate and barium metaborate. The preferred amount of the active antirust pigment in the paint is 2–5 wt %.

The filler is preferably one or more selected from a group consisting of talc powder, mica powder, natural barite powder, calcite powder, light calcium carbonate, precipitated barium sulfate and calcined kaolin. The preferred amount of the filler in the paint is 10–20 wt %. The content of the water-soluble substances in the inert antirust pigment and the filler should be <0.5 Wt %, and preferably <0.3 Wt %.

The thickener is an alkali-soluble acrylic acid emulsion thickener, and the preferred amount of the thickener in the paint is 0.5–2.0 wt %.

The drier is an emulsion comprising cobalt naphthenate, manganese naphthenate and zinc naphthenate as active ingredients and the preferred amount of the drier in the paint is 1–3 wt %.

The industrial soft water is deionized water or distilled water, in which the total amount of water-soluble substances is <100 ppm, and the conductivity is <20 μs/cm.

The aids are any conventionally used ones in the art, for example, a dispersing agent, a wetting agent, a defoamer, antiseptics, antifungal and neutralizer.

The dispersing agent can be one or more selected from the group consisting of sodium salt, ammonium salt and amine salt, of a copolymer formed from an ethylenic monomer and an unsaturated fatty acid and esters thereof.

There are no particular limitations for the wetting agent. Preferred is polyether-modified acetylenic alcohol. The defoamer is a polyether-modified organic silicone. The neuter is a volatile organic amine. Preferred neutralizers are one or more selected from a group consisting of monoethanolamine, 2-amino-1-propanol, N-ethylmorpholine, triethylamine and N,N-dimethylethanolamine.

The following is the examples of this invention. It is to be understood that the invention is not limited to these examples.

Table 1 shows the examples for the emulsion synthesis and performance parameters of the resultant emulsion, in which E-12 and E-20 are bisphenol A type epoxy resin manufactured by Yixing Resin Plant, Jiangsu province, China; AMP-95 is 2-amino-1-propanol manufactured by Air Products and Chemicals Inc., U.S.A. Table 2 shows the example for the water-based paint, in which resin 1, resin 2 and resin 3 are formed respectively from example 1, 2 and 3 in Table 1. Drier VXW is a product from Vianova co., Austria. Thickener TT935 is a product from Dongfang-Rome&Hass Co., Beijing. The dispersing agent 5040 and 5027 and defoamer NXZ are products from Henckel AG, Germany. The wetting agent SURFYNOL GA is a product from Air Products and Chemicals Inc., U.S.A. Table 3 shows the performance parameters of the water-based paint in the examples in Table 2.

The methods for measuring and evaluating various performances, in these examples, are as follows:

| | |
|---|---|
| GB6753.3-86 thermal stability | GB1728-89 drying time |
| GB9268-88 freeze-thaw stability | GB1720-79 adhesive force |
| GB6753.3-86 mechanical stability | GB/T1732-93 impact resistance |
| GB/T 1733-93 waterproof-ness (dry film) | GB/T1731-93 flexibility |
| GB6753.3-86 paint appearance | GB9753-88 cupping test |
| | GB/T1771-91 salt fog resistance |
| GB1724-89 fineness | GB 9268-88 freeze-thaw resistance |
| GB1724-89 viscosity | |
| GB6751-86 solid content | |

In addition, the method for plating in measuring the coating performance in the examples is as follows:

Plating according to GB 1727-92, in which the tinned plate is used for adhesive force, impact resistance, flexibility, and cupping. The plate is brush coated for two times till a film thickness of 20–30 μm is obtained. The low-carbon steel plate is used for salt fog resistance. The low-carbon steel plate is scrubbed with acetone to remove the oil, sanded, and spray coated for two times till a film thickness of 70–110 μm is obtained. Then, the sample plate is dried for 14 days at 23±2° C.

1. Preparing Examples for Epoxy Polyester Emulsion

EXAMPLE 1

In reactor 1, adding 400 g of linseed oil, 90 g of glycerin and 0.2 g of LiOH. Heating up to 230–240° C. and maintain the temperature for 1.5 h. When the tolerance of 95% ethanol becomes 1:9, cooling down to 180° C. Adding 200 g of phthalic anhydride, 50 g of eleostearic acid and 50 g of reflux xylene. Maintain the temperature at 180–190° C. for 3 hrs. 20 g of reflux xylene is removed and 260 g of epoxy resin E-12 is added. The temperature is raised up to 210–220° C. and maintained for 2 hrs until the acid value of the resin dropped to 7.8. The system is cooled down to below 150° C. and transferred to reactor 2, where a mixed solution composed of 20 g of methacrylic acid, 10 g of acrylic acid, 110 g of methyl methacrylate, 110 g of butyl acrylate, 30 g of n-butanol and 5 g of benzoyl peroxide (BPO), was dropped in over 3 hrs at 100–110° C. The reaction is continued for 3 hrs while maintaining the temperature until the acid value of the resin reached 30. The resin is transferred from reactor 2 to reactor 3. The residual monomer was removed during the transferring. 55 g of neutralizer AMP-95 and 1,400 g of industrial soft water were added into reactor 3, adding, and the resultant mire was stirred for 0.5 h to obtain epoxy polyester emulsion 1.

EXAMPLES 2–5

Repeat the procedures in Example 1 except that the raw material and amounts thereof are shown in Table 1 in order to obtain various resins.

TABLE 1

Examples for emulsion synthesis (unit: pbw)

| | Example | | | | |
|---|---|---|---|---|---|
| Item | 1 | 2 | 3 | 4 | 5 |
| Linseed oil | 40 | 50 | 60 | 0 | 50 |
| Soy bean oil | 0 | 0 | 0 | 50 | 0 |
| glycerine | 9 | 8 | 7 | 8 | 8 |
| phthalic anhydride | 20 | 15 | 10 | 15 | 15 |
| Epoxy resin E-12 | 26 | 23 | 20 | 23 | 0 |
| Epoxy resin E-20 | 0 | 0 | 0 | 0 | 23 |
| eleostearic acid | 5 | 4 | 3 | 4 | 4 |
| methacrylic acid | 2 | 2 | 2 | 2 | 2 |
| acrylic acid | 1 | 1 | 1 | 1 | 1 |
| methyl methacrylate | 11 | 11 | 11 | 9 | 13 |
| butyl acrylate | 11 | 11 | 11 | 13 | 9 |

TABLE 1-continued

Examples for emulsion synthesis (unit: pbw)

| Item | Example 1 | 2 | 3 | 4 | 5 |
|---|---|---|---|---|---|
| industrial soft water | 140 | 150 | 130 | 160 | 170 |
| AMP-95 | 5.5 | 5 | 4 | 5 | 4.5 |
| self-emulsifying property | good | good | good | good | good |
| thermal stability | good | good | good | good | good |
| water tolerance(film) | 48 | 48 | 48 | 48 | 48 |
| freeze-thaw stability | 5 | 5 | 5 | 5 | 5 |
| mechanical stability | excellent | excellent | excellent | excellent | excellent |

2. Preparation of a Water-based Paint

EXAMPLE 6

In a vessel, 95 g of industrial soft water, 1.0 g of wetting agent SURFYNOL GA, 1.5 g of dispersant 5040, 0.1 g of defoamer NXZ, 2.5 g of antiseptics KATHON LXE (Rome & Hass Co. U.S.A), 2.6 g of antifingal SKANE M-8 (Rome & Hass Co. U.S.A.), 3 g of 2-amino-1-propanol (AMP-95), are added and mixed well. 300 g of the epoxy polyester emulsion prepared from example 1 is added and mixed well. 220 g of iron oxide red, 80 g of mica powder (600 mesh), 100 g of precipitated $BaSO_4$, 15 g of $Zn_3(PO_4)_2$, and 5 g of $ZnMoO_4$ are added and mixed well. The resulting mixture is grinded with a sand mill until a fineness of <50 μm is obtained to form a colored slurry. The resultant colored slurry is added into a paint mixer, and 150 g of the epoxy polyester emulsion prepared from example 1, 15 g of drier VXW, 10 g of thickener TT-935 and 3 g of 2-amino-1-propanol (AMP-95) are added, mixed well, and filtered to obtain the final product.

EXAMPLES 7–14

The process for preparing the water-based paint of example 7–14 is the same as that in Example 6 except that the raw materials used are shown in 2#–9# in Table 2.

TABLE 2

Examples for water-based paint (unit: g)

| raw material (g) | 1# | 2# | 3# | 4# | 5# | 6# | 7# | 8# | 9# |
|---|---|---|---|---|---|---|---|---|---|
| soft water | 95 | 60 | 50 | 95 | 70 | 50 | 70 | 60 | 55 |
| SORFYNOL GA | 1.0 | 1.5 | 1.5 | 1.8 | 1.5 | 1.6 | 1.1 | 1.4 | 1.2 |
| dispersant 5040 | 1.5 | 1.6 | 1.4 | 1.7 | 1.0 | 1.6 | 0 | 0 | 0 |
| dispersant 5027 | 0 | 0 | 0 | 0 | 0 | 0 | 1.5 | 1.7 | 1.3 |
| defoamer NXZ | 0.1 | 0.2 | 0.3 | 0.3 | 0.2 | 0.2 | 0.1 | 0.2 | 0.1 |
| KATHON LXE | 2.5 | 1.1 | 1.5 | 2.6 | 2.8 | 1.2 | 2.2 | 1.3 | 2.7 |
| SKANE M-8 | 2.6 | 1.2 | 1.0 | 2.3 | 2.2 | 2.0 | 1.8 | 1.3 | 2.4 |
| AMP-95 | 6 | 4 | 3 | 2 | 2.5 | 3 | 4 | 6 | 5 |
| iron oxide red | 220 | 190 | 0 | 0 | 0 | 0 | 250 | 190 | 200 |
| Mica iron oxide | 0 | 0 | 250 | 200 | 190 | 200 | 0 | 0 | 0 |
| 800 mesh talc | 0 | 105 | 70 | 100 | 80 | 60 | 60 | 50 | 0 |
| 600 mesh mica | 80 | 0 | 0 | 0 | 60 | 65 | 0 | 100 | 80 |
| ppt. $BaSO_4$ | 100 | 100 | 0 | 100 | 100 | 50 | 0 | 50 | 100 |
| calc. kaolin | 0 | 0 | 80 | 0 | 0 | 0 | 120 | 50 | 0 |
| $Zn_3(PO_4)_2$ | 15 | 10 | 10 | 10 | 15 | 35 | 10 | 5 | 20 |
| $ZnMoO_4$ | 5 | 5 | 10 | 10 | 5 | 10 | 5 | 5 | 5 |
| Resin 1 | 450 | 500 | 500 | 0 | 0 | 0 | 0 | 0 | 0 |
| Resin 2 | 0 | 0 | 0 | 450 | 450 | 500 | 0 | 0 | 0 |
| Resin 3 | 0 | 0 | 0 | 0 | 0 | 0 | 450 | 450 | 500 |
| VXW drier | 15 | 16 | 17 | 17 | 18 | 19 | 18 | 19 | 20 |
| TT935 thickener | 10 | 9 | 8 | 10 | 9 | 8 | 10 | 9 | 8 |

TABLE 3

Performances for water-based paint

| Item | Example 1 | 2 | 3 | 4 | 5 | 6 | 7 | 8 | 9 |
|---|---|---|---|---|---|---|---|---|---|
| Paint appearance | accepted | accepted | accepted | accepted | accepted | accepted | accepted | accepted | accepted |
| coating appearance | accepted | accepted | accepted | accepted | accepted | accepted | accepted | accepted | accepted |
| fineness, μm | 45 | 45 | 45 | 45 | 45 | 45 | 45 | 45 | 45 |
| viscosity, s, > | 30 | 30 | 30 | 30 | 30 | 30 | 30 | 30 | 30 |
| solid content, %, > | 50 | 50 | 50 | 50 | 50 | 50 | 50 | 50 | 50 |
| drying time surface dry, h | 2 | 2 | 2 | 2 | 2 | 2 | 2 | 2 | 2 |
| real dry, h | 24 | 24 | 24 | 24 | 24 | 24 | 24 | 24 | 24 |
| adhesive force, degree | 1 | 1 | 1 | 1 | 1 | 1 | 1 | 1 | 1 |
| impact resistance, Kg · cm | 40 | 40 | 40 | 40 | 40 | 40 | 40 | 40 | 40 |
| flexibility, mm | 2 | 2 | 2 | 2 | 2 | 2 | 2 | 2 | 2 |
| cupping, mm | 5 | 5 | 5 | 5 | 5 | 5 | 5 | 5 | 5 |
| Salt fog tost, h | 500 | 500 | 500 | 500 | 500 | 500 | 500 | 500 | 500 |
| freeze-thaw test, cycle | 5 | 5 | 5 | 5 | 5 | 5 | 5 | 5 | 5 |

Compared with the existing water-based acrylic acid, water-based epoxy polyester and water-based alkyd antirust paint, the epoxy polyester emulsion according to this invention and the water-based paint comprising said emulsion as the base material have a lot of advantages. Firstly, the antirust property is good, which is because of following reasons: (1) the present water-based paint comprises the emulsifier-free epoxy polyester emulsion as the base material and the emulsion does not contain polyether segment, and also the acid value of the resin is far lower than the common water-soluble resin and the hydrophobicity of the paint film is good; (2) the emulsion particles have a small particle size (130 nm) and are narrowly distributed, and thus the paint film has high denseness; (3) because no persulfate initiator is used during the synthesis of the resin, sulfonic group or $SO_4^{2-}$ ion having a corrosion accelerating effect is not produced; and (4) in addition, the mechanical stability of said epoxy polyester emulsion is good. The emulsion can be ground together with a pigment and filler, and so the amounts of the hydrophilic dispersant and wetting agent can be greatly reduced. The water resistance of the paint film is further improved. Hence, the antirust property of the coating of the water-based paint according to this invention is obviously superior to the water-based primer comprising the common acrylic emulsion, water-soluble acrylic resin or water-soluble alkyd resin as the base material. Secondly, the stability is good. The epoxy polyester emulsion according to this invention has a relatively high thermal stability. The inert pigment iron oxide red is used as the main antirust pigment in the present water-based paint, and so both the storage stability and the freeze-thaw stability of the paint are good. Thirdly, it is easy and safe to use the water-based paint according to this invention. The water-based paint according to this invention does not contain a cosolvent can be directly diluted with water. The paint according to this invention is characterized in non-toxicity, incombustibility, quick-drying, safety and easy in operation, and high-efficiency. It has been proved that said water-based paint is suitable for anticorrosive metal paints in the facilities such as train, automobile, ship, bridge, pipeline and storage tanks. Fourthly, said water-based paint can be prepared from a wide variety of raw materials, has a low cost, and is easy to apply on a large scale.

The specification and examples above are presented to aid in the complete and non-limiting understanding of the invention disclosed herein. Since many variations and embodiments of the invention can be made without departing from its spirit and scope, the invention resides in the claims hereinafter appended.

What is claimed is:

1. An acrylic acid-modified epoxy polyester resin, comprising 100 pbw of a copolymer (A) made from an unsaturated fatty acid-modified polyester and bisphenol A type epoxy resin, and 20–40 pbw of poly(meth)acrylic acid (ester) (B), which can be prepared by a process comprising the following steps:
   (1) alcoholyzing a drying oil with a polyol;
   (2) adding successively, to the product from step (1), a dibasic anhydride, an unsaturated fatty acid containing a conjugated double bond and an epoxy resin, and esterifying to obtain an epoxy polyester; and
   (3) copolymerizing the epoxy polyester from step (2) and an acrylic monomer.

2. An acrylic acid-modified epoxy polyester resin according to claim 1, having an acid value of 20–40.

3. An acrylic acid-modified epoxy polyester resin according to claim 1, wherein said drying oil is an unsaturated vegetable oil having an iodine value above 130.

4. An acrylic acid-modified epoxy polyester resin according to claim 1, wherein said polyol is selected from the group consisting of glycerine pentaerythritol, trimethylolpropane, or the mixture thereof, and the amount of said polyol, based on 100 pbw of (A), is 10–15 pbw.

5. An acrylic acid-modified epoxy polyester resin according to claim 1, wherein said dibasic anhydride is selected from the group consisting of phthalic anhydride, tetrahydrophthalic anhydride, maleic anhydride, or the mixture thereof, and the amount of said dibasic anhydride, based on 100 pbw of (A), is 15–25 pbw.

6. An acrylic acid-modified epoxy polyester resin according to claim 1, wherein said epoxy resin is a bisphenol A type difunctional epoxy resin having a weight average molecular weight of 900–2,000, and the amount of the resin, based on 100 pbw of (A), is 20–30 pbw.

7. An acrylic acid-modified epoxy polyester resin according to claim 1, wherein the amount of the unsaturated fatty acid, based on 100 pbw of (A), is 2–10 pbw.

8. An acrylic acid-modified epoxy polyester resin according to claim 1, wherein said acrylic monomer is one or more selected from the group consisting of acrylic acid, methacrylic acid, butyl acrylate, butyl methacrylate and methyl methacrylate, and the amount of the acrylic monomer, based on 100 pbw of (A), is 20–40 pbw.

9. An acrylic acid-modified epoxy polyester resin according to claim 1, wherein said esterification in step (2) of said process is carried out at 120–180° C. and when the acid value is 5–10, and the viscosity is 4–6 s, the esterification is complete.

10. A process for preparing the acrylic acid-modified epoxy polyester resin according to any one of claims 1–9, comprising the following steps:
   (1) alcoholzing a drying oil with a polyol;
   (2) adding successively, to the product from step (1), a dibasic anhydride, an unsaturated fatty acid containing a conjugated double bond and an epoxy resin, and esterifying to obtain an epoxy polyester; and
   (3) copolymerizing the epoxy polyester from step (2) and a (meth)acrylic acid (ester).

11. An epoxy polyester emulsion comprising 30–50 wt % of said acrylic acid-modified epoxy polyester resin according to any one of claims 1–9.

12. A process for preparing the epoxy polyester emulsion according to claim 11, comprising the following steps:
   (1) alcoholyzing a drying oil with a polyol;
   (2) adding successively, to the product from step (1), a dibasic anhydride, an unsaturated fatty acid containing a conjugated double bond and an epoxy resin, and esterifying to obtain an epoxy polyester;
   (3) copolymerizing the epoxy polyester from step (2) and a (meth)acrylic acid (ester); and
   (4) neutralizing the product from step (3) with a neutralizer, sting with water, and self-emulsifying.

13. A water-based paint composition comprising, based on 100% of total weight of the composition, 20–60 wt % of the acrylic acid-modified epoxy polyester emulsion according to claim 11.

14. An acrylic acid-modified epoxy polyester resin according to claim 7 wherein said unsaturated fatty acid containing a conjugated bond is eleostearic acid.

15. An acrylic acid-modified epoxy polyester resin according to claim 9 wherein when the acid value is 6–8, and the viscosity is 4–6 s, the esterification is complete.

* * * * *